United States Patent [19]

Day

[11] 3,879,638

[45] Apr. 22, 1975

[54] HELICOPTER RESCUE HOIST, STATIC ELECTRIC SHOCK INSULATOR

[76] Inventor: Douglas B. Day, 1601 Benson Dr., Dayton, Ohio 45406

[22] Filed: Oct. 11, 1973

[21] Appl. No.: 405,721

[52] U.S. Cl. .................................. 317/2 R; 317/2 E
[51] Int. Cl. ......................... F16g 11/00; H05f 3/00
[58] Field of Search ..................... 317/2 R, 2 D, 2 E

[56] References Cited
UNITED STATES PATENTS
3,416,033   12/1968   Hoover et al. .................... 317/2 R

*Primary Examiner*—L. T. Hix
*Attorney, Agent, or Firm*—Henry S. Miller

[57] ABSTRACT

A wire rope having a ball shaped swedged end and an insulative sleeve, a pair of steel collets surrounding the ball, a pair of nylon insulators separated by a thin gasket, surrounding the collets and held by a spring steel retainer and a steel adapter surrounding the insulator and so constructed to receive a hook assembly and to apply a compression force to the swedged end.

1 Claim, 2 Drawing Figures

HELICOPTER RESCUE HOIST, STATIC ELECTRIC SHOCK INSULATOR

BACKGROUND OF THE INVENTION

This invention relates generally to static electricity shock insulators and more specifically to an electrical shock insulator for helicopter rescue hoists.

With the increased use of helicopters as rescue vehicles during periods of national emergency or disaster more emphasis is placed upon their safety and reliability. In many rescue operations, particularly in forests or mountainous areas, the terrain is unsuitable for the helicopter to make a safe landing in order to pick up casualties. As a result, most helicopters are equipped with an electrically driven winch and uses a wire rope with a hook on one end. For attachments to the hook are a number of differed rescue devices including collars and baskets that will allow a person to be lifted into the helicopter by the winch.

A generally unexpected safety hazard inolved in the use of this type of rescue system is electrical shock. Helicopters with their large rotating wings, act as large Vande Graff generators. This is particularly a problem in dry cold weather when large static electricity charges are built up. Anyone in contact with both the ground and the helicopter may be shocked badly. There have been examples of persons being burned or knocked down as a result of this shock. Further, there have been examples of persons being shocked after they have boarded a rescue device and then as they are raised to the helicopter accidently coming in contact with an electrical ground and receiving a serious shock.

Heretofore, all efforts to solve this problem have centered on the use of complicated electronic devices or simple grounding wires to dissipate static charge from the helicopter to ground. The results of these efforts have not proven successful. Electronic devices in general lack reliability and the cost for reliability is prohibitive. Grounding wires, although simpler and less expensive than electronics tend to become tangled in objects on or near the ground because of the violent wind created by the rotating wings.

This invention represents a new and novel approach to the problem by providing an insulated coupling with sufficient strength and reliability to be used in rescue work.

SUMMARY OF THE INVENTION

The invention involves the use of a conventional wire rope of the type normally used for helicopter rescue operations. The wire rope has a ball shaped swedge device at its terminus. Near this terminus and extending for several inches along the wire rope is a flexible insulating sleeve. Surrounding the ball is a shaped collet that is separable into two half pieces. Surrounding the collet is a heavy insulation material, which like the collet is separable into two half pieces. The pieces of the insulator are separated by a thin soft rubber gasket to prevent the possibility of electrical leakage therethrough. The insulator is secured in position by a steel spring retainer.

Encasing the insulator is a metal adapter that functions as the attachment point for rescue equipment.

It is therefore an object of the invention to provide a new and improved shock insulated means for helicopter rescue hoists.

It is another object of the invention to provide a new and improved shock insulated adapter for helicopter rescue hoists that is not complex in design and highly reliable.

It is a further object of the invention to provide a new and improved rescue hoist adapter that will prevent persons from being electrically shocked.

It is still another object of the invention to provide a new and improved rescue hoist adapter that is strong, light in weight and easily assembled.

These and other advantages, features and objects of the invention will become more apparent from the following description taken in connection with the illustrative embodiment in the accompanying drawings.

DESCRIPTION OF THE PREFERRED EMBODIMENT

Figure 1:
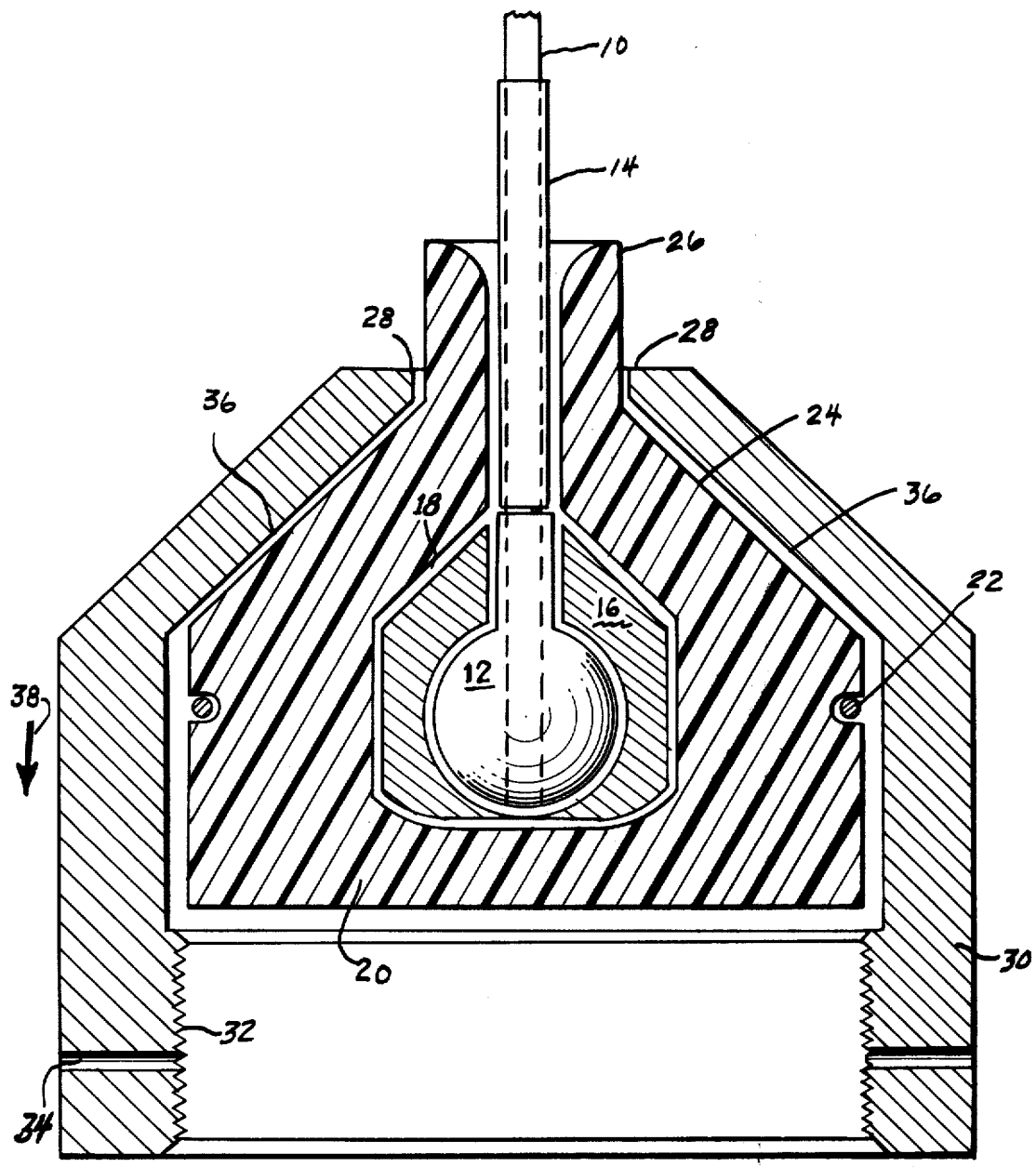
FIG. 1 is a crossectional view of the invention.

Referring now to FIG. 1, a wire rope 10 extends from the helicopter winch to its terminus at the swedge ball 12. A heavy flexible insulating sleeve 14, preferably of a plastic like material covers the last few inches of the wire rope.

A steel collet 16 surrounds the swedge ball and consists of two halves for ease of installation and removal. The collets are made with a sloping surface 18 for purposes that will be explained hereinafter.

Around the collet is an electrically insulative material 20. The material could be, for example, nylon, although other materials could be substituted. The insulative material is formed so that it is in close restraining contact with the collet 16. The insulator is formed of two half pieces held together by a retainer spring 22. Positioned between the two insulator pieces is a thin soft and compressible rubber gasket that perfects the electrical seal between the two insulator elements. The exterior surface of the insulator is sloped at 24 in the same fashion as the slope of the collet surface at 18. The insulator has an extending portion 26 that surrounds the wire rope 10 and protects the rope from the edges 28 of the adapter 30.

The adapter 30 is steel and is fitted at one end with threads 32 and a cotter key pin hole 34 to accept and secure rescue paraphanalia. At the other end of the adapter is an opening through which the extending portion 26 of the insulator 20 protrudes.

The upper surfaces 36 of the adapter match and coincide with the surfaces 18 and 24 of the insulator and collet.

In operation, as a force is applied in the direction of the arrow 38, the adapter applies a compression force against the insulator which in turn applies a compression force against the collet 16, forcing the pieces together and against the swedge ball 12. The opening in the adapter 30 provides only absolute minimum clearance around the ball 12 for assembly purposes. This adds a safety factor, in that despite the unlikely event of a collapse of the insulation material from overload, the debris would prevent the adapter from sliding over the ball and possible injury to the rescue victim.

Figure 2:
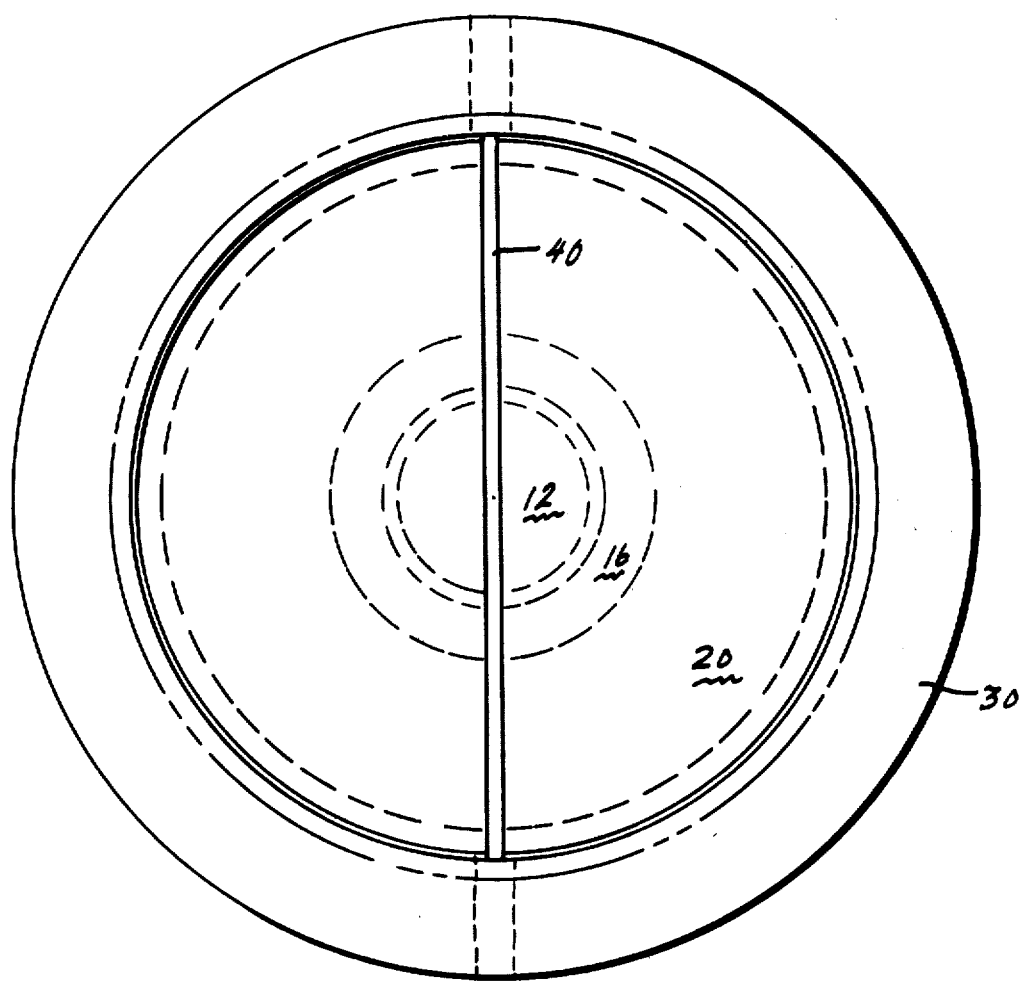
FIG. 2 is a bottom view of the invention.

FIG. 2 is a bottom view of the invention. The adapter 30 surrounds the insulator 20. The rubber gasket separating the two insulator pieces is shown at 40. The collet is shown in phantom at 16 as with the swedge ball 12 by passing the ball through the aperature 28 in the adapter 30. This opening is in the order of a few thousands of an inch larger than the diameter of the ball. The adapter is moved approximately twelve inches along the wire rope 10, thereby providing sufficient room to assemble the remaining parts. The insulating sleeve 14 is then slipped over the ball and into position. The collet 16, insulator 20 and gasket 40 are then assembled around the ball and held in position by the spring retainer 22. The adapter is then returned to its position over the aforementioned parts enclosing them. A hook assembly or other suitable device is then brought into threaded engagement with the adapter and the assembly is complete.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. An electrically shock proof adapter for helicopter rescue hoists comprising: a wire rope; a swedge means securely fixed to one end of the wire rope; collet means surrounding said shaped means and having one sloping exterior surface; insulator means encasing said collet means, having a closed surface and an apertured extension for receiving the wire rope, and a metal adapter means, encasing said insulator means having a sloped surface and further having an aperture on one end for passing the wire rope and insulator extension therethrough and threaded means at the opposing end for receiving similarly threaded rescue equipment.

* * * * *